United States Patent
Singh

(10) Patent No.: US 10,088,029 B1
(45) Date of Patent: Oct. 2, 2018

(54) CAM FOLLOWER BEARING ARRANGEMENT FOR ROLLER TAPPET

(71) Applicant: Schaeffler Technologies AG & Co. KG, Herzogenaurach (DE)

(72) Inventor: Satyam Singh, Oak Park, MI (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 15/478,673

(22) Filed: Apr. 4, 2017

(51) Int. Cl.
| F16H 53/06 | (2006.01) |
| F16C 17/02 | (2006.01) |
| F16H 25/14 | (2006.01) |
| F16C 11/04 | (2006.01) |

(52) U.S. Cl.
CPC .......... *F16H 53/06* (2013.01); *F16C 11/045* (2013.01); *F16C 17/02* (2013.01); *F16H 25/14* (2013.01)

(58) Field of Classification Search
CPC .......... F16H 25/14; F16H 53/06; F16H 53/08; F16C 17/02; F16C 17/035; F16C 33/04; F16C 11/045
See application file for complete search history.

(56) References Cited

U.S. PATENT DOCUMENTS

| 1,415,142 | A | * | 5/1922 | Bowman | ................. | F16C 17/02 |
| | | | | | | 384/419 |
| 5,385,124 | A | | 1/1995 | Hillebrand et al. | | |
| 7,712,443 | B2 | | 5/2010 | Gemein | | |
| 8,522,643 | B2 | * | 9/2013 | Dorn | ....................... | F01L 1/143 |
| | | | | | | 74/559 |
| 8,800,519 | B2 | * | 8/2014 | Dorn | ....................... | F01L 1/14 |
| | | | | | | 123/90.48 |
| 9,291,247 | B2 | * | 3/2016 | Dorn | ..................... | F02M 59/102 |
| 2016/0047412 | A1 | * | 2/2016 | Stuk | ....................... | F16C 17/02 |
| | | | | | | 384/276 |

FOREIGN PATENT DOCUMENTS

| DE | 102010026361 A1 * | 1/2012 | ............. F01L 1/143 |
| DE | 102011084850 A1 * | 4/2013 | ............... F01L 1/18 |

OTHER PUBLICATIONS

Machine translation of DE 102011084850 A1 obtained on Feb. 7, 2018.*
U.S. Appl. No. 15/282,529, filed Sep. 30, 2016 (not yet published).

* cited by examiner

Primary Examiner — Adam D Rogers
(74) Attorney, Agent, or Firm — Volpe and Koenig, P.C.

(57) ABSTRACT

A roller tappet including bearing sleeves is disclosed. The roller tappet includes a housing having a circumferential sidewall with a first sidewall portion including a first bore and a second sidewall portion including a second bore diametrically opposed to the first bore. A roller is positioned at least partially inside the housing between the first sidewall portion and the second sidewall portion. A first bearing sleeve is arranged in the first bore of the housing and a second bearing sleeve arranged in the second bore of the housing. An axle extends through the first bearing sleeve and the second bearing sleeve and through the roller, such that the roller is rotatably mounted on the axle within the housing. Axial ends of the axle are respectively positioned in and rotatable relative to the first bearing sleeve and the second bearing sleeve.

9 Claims, 4 Drawing Sheets

US 10,088,029 B1

CAM FOLLOWER BEARING ARRANGEMENT FOR ROLLER TAPPET

FIELD OF INVENTION

This invention is generally related to a cam follower assembly and is more particularly related to a roller tappet for a cam follower assembly.

BACKGROUND

Known cam follower assemblies typically include a rotating cam and a roller tappet including a roller supported by an axle mounted in a housing. The roller, which is configured to ride along the rotating cam, is rotatably mounted on the axle, which is retained in the housing. One type of roller tappet includes a fixed axle including staked ends such that the axle is non-rotatably fixed to the housing. Another type of roller tappet includes a floating axle with enlarged ends that axially retain the floating axle in bores on the housing such that the floating axle is configured to rotate relative to the housing.

Floating axles typically provide improved wear distribution compared to fixed axles, i.e. staked-end axles. During operation, fixed axles can experience relatively higher loading and wear along specific axle segments than floating axles. Accordingly, floating axles are sometimes used instead of fixed axles due to a generally more even wear distribution. However, floating axles can also fail to rotate properly during operation. Rotation of a floating axle can be interrupted due to a lack of precision machining of the housing bores that accommodate the axle or the axle itself. For example, the housing bores or the axle may be out-of-round or may include a high surface roughness which causes friction and inhibits or prevents relative rotation. In these situations, the axle does not rotate or gets stuck in a particular angular position, effectively producing a fixed axle which is susceptible to uneven wear distribution.

It would be desirable to provide an improved bearing interface between a floating axle and a housing for a roller tappet that prevents uneven wear distribution.

SUMMARY

A roller tappet including bearing sleeves that promote even wear distribution of an axle within the roller tappet is provided. The roller tappet includes a housing defined by a circumferential sidewall with a first sidewall portion including a first bore and a second sidewall portion including a second bore diametrically opposed to the first bore. The first sidewall portion and the second sidewall portion are offset radially inwardly from an outer circumference of the circumferential sidewall of the housing. A roller is positioned at least partially inside the housing between the first sidewall portion and the second sidewall portion. A first bearing sleeve is arranged in the first bore of the housing and a second bearing sleeve arranged in the second bore of the housing. An axle extends through the first bearing sleeve and the second bearing sleeve and through the roller, such that the roller is rotatably mounted on the axle within the housing. Axial ends of the axle are respectively positioned in and rotatable relative to the first bearing sleeve and the second bearing sleeve. The bearing sleeves are provided to promote more even wear distribution of the axle during operation.

Preferred arrangements with one or more features of the invention are described below and in the claims.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Figure 1:
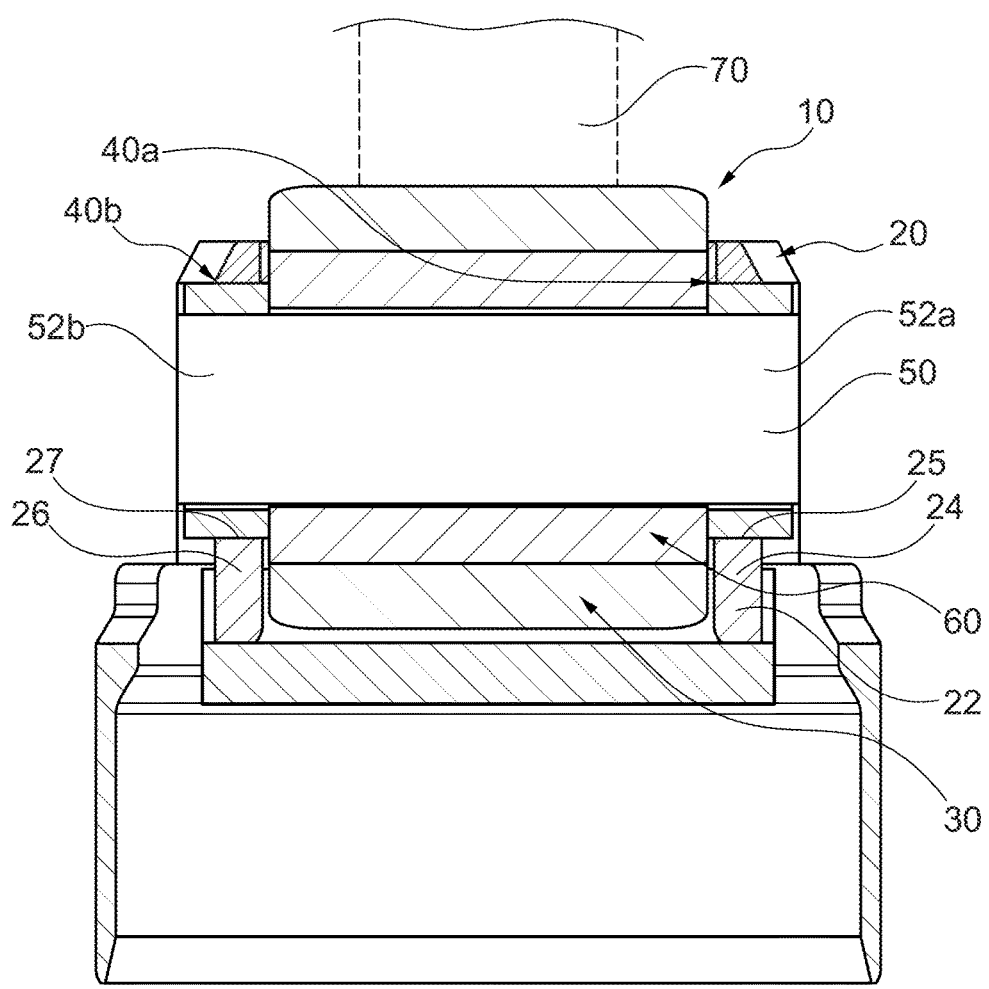
FIG. 1 is a cross section view of a roller tappet including bearing sleeves according to a first embodiment.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
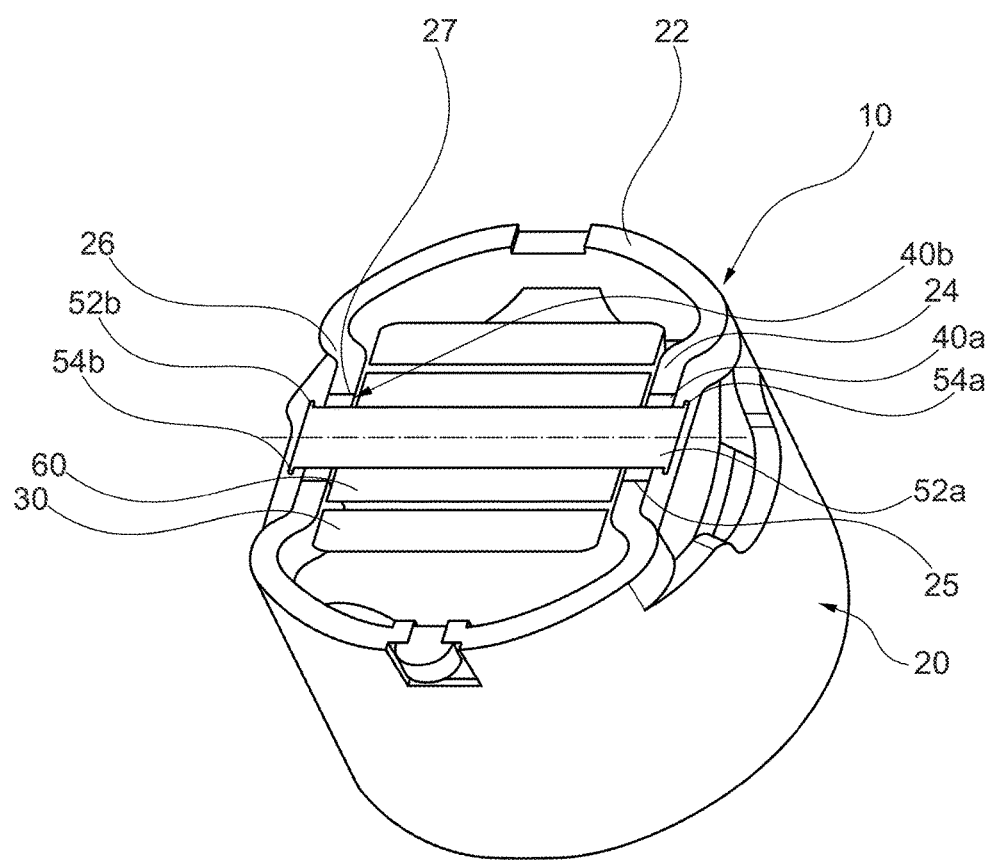
FIG. 2 is a perspective view, partially in cross section of the roller tappet of FIG. 1.

As shown in FIGS. 1 and 2, a roller tappet 10 according to a first embodiment is provided. The roller tappet 10 can be provided between a rotating cam 70 (shown in broken lines in FIG. 1) and an associated actuated body (not shown). In one embodiment, the actuated body is a valve stem. The roller tappet 10 includes a housing 20 defined by a circumferential sidewall 22 with a first sidewall portion 24 including a first bore 25 and a second sidewall portion 26 including a second bore 27 diametrically opposed to the first bore 25. The first sidewall portion 24 and the second sidewall portion 26 are offset radially inwardly from an outer circumference of the circumferential sidewall 22, as shown most clearly in FIG. 2. The first sidewall portion 24 and the second sidewall portion 26 are indented from the outer circumference of the circumferential sidewall 22 to provide a support region for an axle 50, which is disclosed in more detail below. The housing 20 is preferably formed from sheet metal.

As shown in FIGS. 1 and 2, a roller 30 is positioned at least partially inside the housing 20 between the first sidewall portion 24 and the second sidewall portion 26. The roller 30 is configured to contact an associated rotating cam 70, which is shown in broken lines in FIG. 1.

Figure 3:
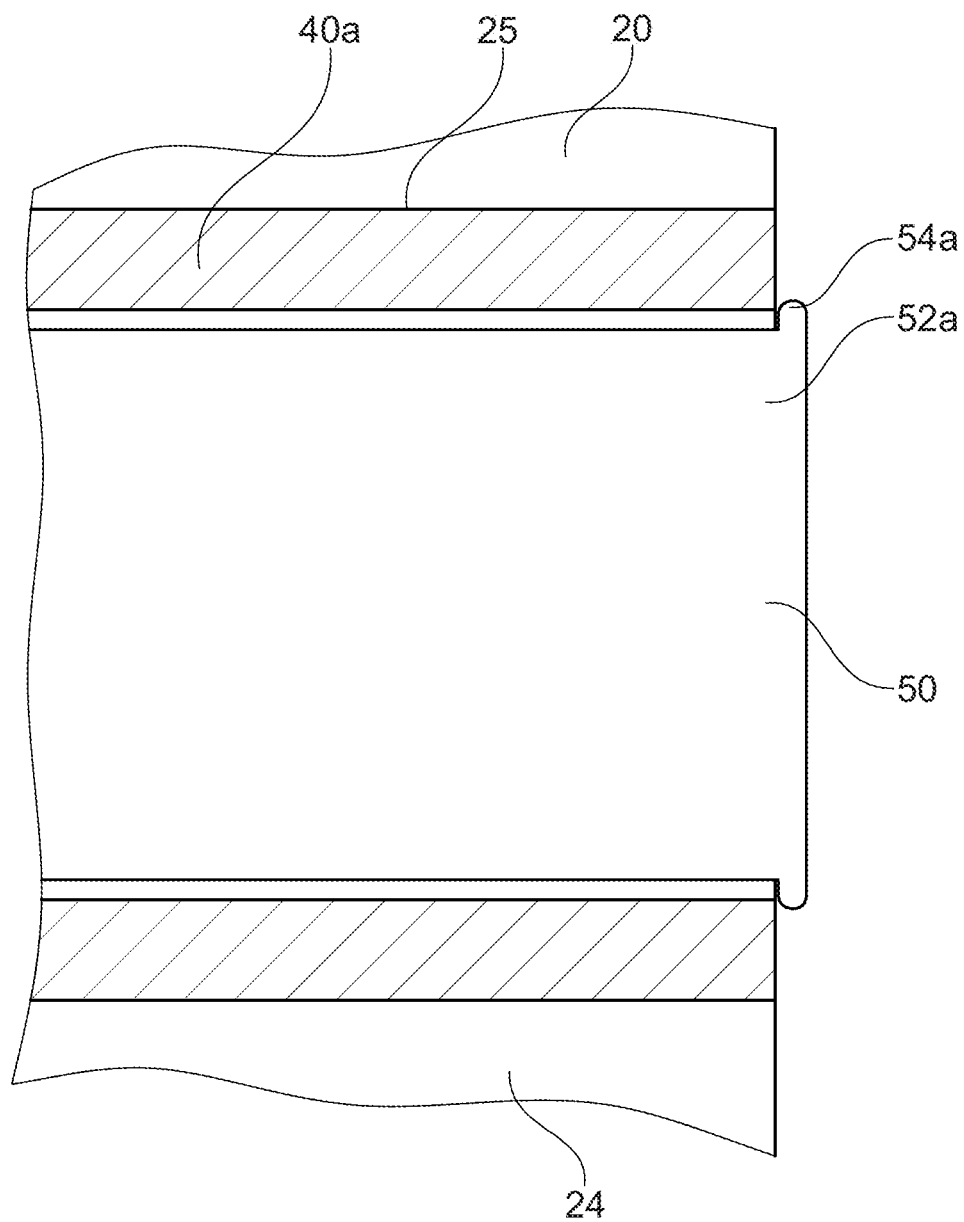
FIG. 3 is an enlarged view of an axle of the roller tappet of FIGS. 1 and 2.

A first bearing sleeve 40a is arranged in the first bore 25 of the housing 20 and a second bearing sleeve 40b is arranged in the second bore 27 of the housing 20. In the embodiment of FIGS. 1-3, the first bearing sleeve 40a and the second bearing sleeve 40b are supported in the housing 20 by a press-fit with the first bore 25 and the second bore 27, respectively. The first bearing sleeve 40a and the second bearing sleeve 40b are preferably formed from a steel alloy. However, other suitable bearing materials could be utilized.

An axle 50 extends through the first bearing sleeve 40a and the second bearing sleeve 40b and through the roller 30, such that the roller 30 is rotatably mounted on the axle 50 within the housing 20. In one embodiment shown in FIGS. 1 and 2, a plurality of needles 60 are positioned between the axle 50 and the roller 30 for rotatably mounting the roller 30 on the axle 50. The plurality of needles 60 are optional and in another embodiment the plurality of needles 60 can be omitted. The plurality of needles 60 ride along a radially inner race formed on the axle 50 and a radially outer race formed on the roller 30. Axial ends 52a, 52b of the axle 50 are respectively positioned in and rotatable relative to the first bearing sleeve 40a and the second bearing sleeve 40b. As shown most clearly in FIG. 3, the axle 50 includes a first enlarged end 54a on its first axial end 52a and at an outer side of the first bearing sleeve 40a which axially retains the axle 50 to the housing 20. The axle 50 similarly includes a second enlarged end 54b on its second axial end 52b and at an outer side of the second bearing sleeve 40b which axially retains the axle 50 to the housing 20. The first enlarged end 54a of the axle 50 axially overlaps with the first bearing sleeve 40a, and the second enlarged end 54b of the axle 50 axially overlaps with the second bearing sleeve 40b.

The bearing sleeves 40a, 40b promote free rotation of the axle 50 relative to the housing 20 during operation so that the axle 50 experiences even wear distribution. The bearing sleeves 40a, 40b provide an improved bearing surface for the axle 50 compared to known roller tappet assemblies where the axle 50 is directly supported in the bores 25, 27 of the housing 20. The interior surfaces of the bearings sleeves 40a, 40b can be precision machined and/or treated to promote free rotation of the axle 50 relative to the housing 20.

Figure 4:
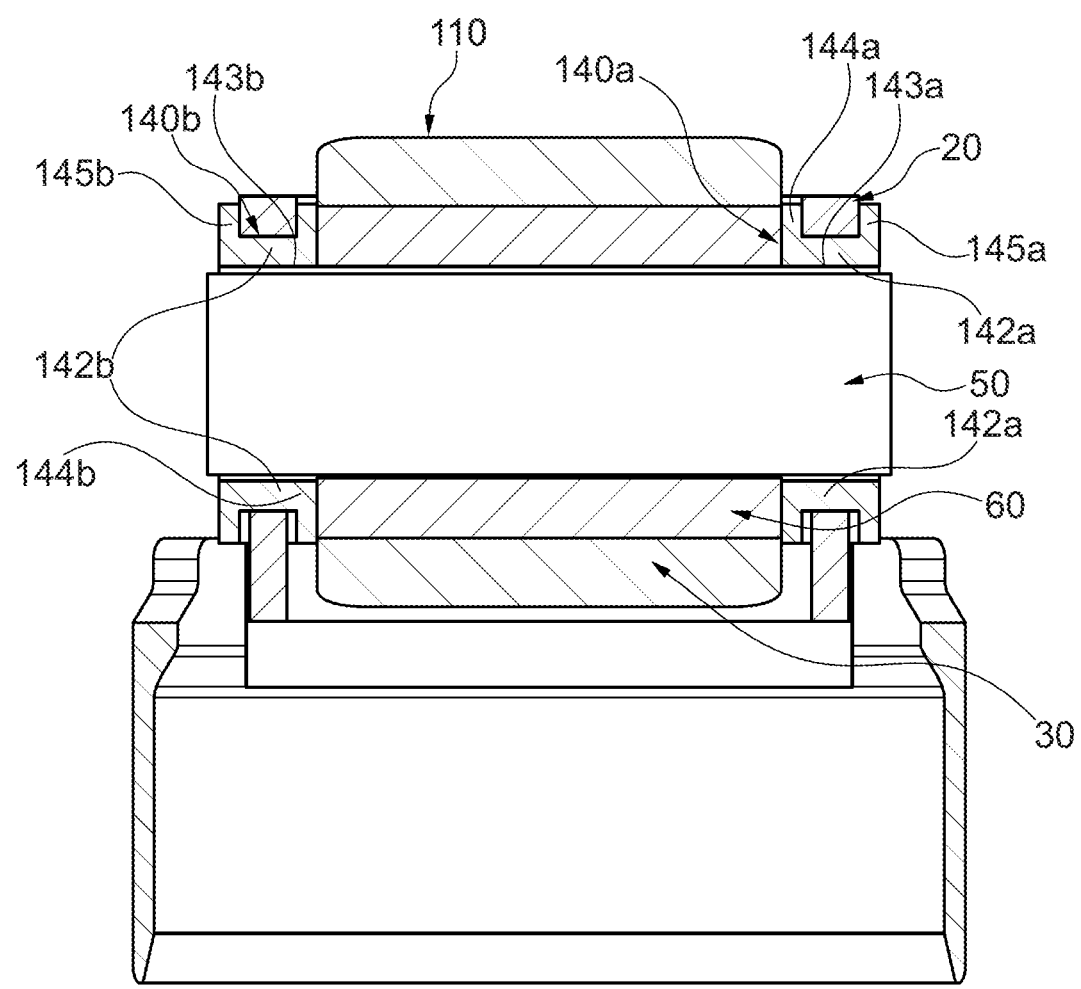
FIG. 4 is a cross section view of a roller tappet including bearing sleeves according to a second embodiment.

FIG. 4 illustrates a second embodiment of a roller tappet 110. The roller tappet 110 of the second embodiment includes an identical housing 20, roller 30, axle 50, and needles 60 as the first embodiment, and only the bearing sleeves 140a, 140b of the second embodiment differ from the bearing sleeves 40a, 40b of the first embodiment. As shown in FIG. 4, the first bearing sleeve 140a and the second bearing sleeve 140b of the second embodiment each have a U-shaped cross-section defined by a center ring 142a, 142b including a bearing surface 143a, 143b for the axle 50, and an inner lip 144a, 144b and an outer lip 145a, 145b arranged on opposite ends of the center ring 142a, 142b that extend radially outwardly from the center ring 142a, 142b. These lips 144a, 144b, 145a, 145b provide axial retention of the bearing sleeves 140a, 140b relative to the housing 20 via a locational fit or slip fit, which does not require a friction fit or press fit with the housing 20 to retain the bearing sleeves 140a, 140b. The lips 144a, 144b, 145a, 145b are preferably formed as cylindrical flanges. The lips 144a, 144b, 145a, 145b preferably extend perpendicular from the respective center rings 142a, 142b. The bearing sleeves 140a, 140b of the second embodiment provide the same improvements with respect to promoting free rotation of the axle 50 relative to the housing 20 as described above regarding the bearing sleeves 40a, 40b of the first embodiment. In one embodiment, the bearing sleeves 140a, 140b of the second embodiment can freely rotate with respect to the housing 20 and are not rotationally fixed relative to the bores 25, 27 of the housing 20. In another embodiment, the bearing sleeves 140a, 140b are rotationally fixed with respect to the bores 25, 27 of the housing 20.

Having thus described various embodiments of the present invention in detail, it is to be appreciated and will be apparent to those skilled in the art that many changes, only a few of which are exemplified in the detailed description above, could be made in the embodiments without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LIST OF REFERENCE NUMBERS roller tappet 10
housing 20
circumferential sidewall 22
first sidewall portion 24
first bore 25
second sidewall portion 26
second bore 27
roller 30
bearing sleeves 40a, 40b
axle 50
axial ends of axle 52a, 52b
enlarged ends of axle 54a, 54b
needles 60
rotating cam 70
roller tappet 110
bearing sleeves 140a, 140b
center ring 142a, 142b
bearing surface 143a, 143b
inner lip 144a, 144b
outer lip 145a, 145b

What is claimed is:

1. A roller tappet comprising:
a housing including a circumferential sidewall with a first sidewall portion including a first bore and a second sidewall portion including a second bore diametrically opposed to the first bore, the first sidewall portion and the second sidewall portion being offset radially inwardly from an outer circumference of the circumferential sidewall;
a roller positioned at least partially inside the housing between the first sidewall portion and the second sidewall portion;
a first bearing sleeve arranged in the first bore of the housing and a second bearing sleeve arranged in the second bore of the housing; and
an axle extending through the first bearing sleeve and the second bearing sleeve and through the roller, such that the roller is rotatably mounted on the axle within the housing;
wherein axial ends of the axle are respectively positioned in and rotatable relative to the first bearing sleeve and the second bearing sleeve,
wherein the first bearing sleeve and the second bearing sleeve each have a U-shaped cross-section defined by a center ring including a bearing surface for the axle, and an inner lip and an outer lip arranged on opposite ends of the center ring that extend radially outwardly from the center ring, and the inner lips and the outer lips axially retain the first bearing sleeve and the second bearing sleeve with the housing, and
the first bearing sleeve and the second bearing sleeve are freely rotatable.

2. The roller tappet of claim 1, further comprising a plurality of needles positioned between the axle and the roller for rotatably mounting the roller on the axle.

3. The roller tappet of claim 1, wherein the axle further includes a first enlarged end at an outer side of the first bearing sleeve and a second enlarged end at an outer side of the second bearing sleeve which retain the axle to the housing.

4. The roller tappet of claim 3, wherein the first enlarged end of the axle axially overlaps with the first bearing sleeve, and the second enlarged end of the axle axially overlaps with the second bearing sleeve.

5. The roller tappet of claim 1, wherein the housing is formed from sheet metal, and the first bearing sleeve and the second bearing sleeve are formed from a steel alloy.

6. The roller tappet of claim 1, wherein an axial clearance is defined between both (a) the inner lips and the housing, and (b) the outer lips and the housing.

7. A cam arrangement, comprising:
   a rotatable cam;
   a roller tappet comprising:
      a housing including a circumferential sidewall with a first sidewall portion including a first bore and a second sidewall portion including a second bore diametrically opposed to the first bore, the first sidewall portion and the second sidewall portion being offset radially inwardly from an outer circumference of the circumferential sidewall;
      a roller positioned at least partially inside the housing between the first sidewall portion and the second sidewall portion;
      a first bearing sleeve arranged in the first bore of the housing and a second bearing sleeve arranged in the second bore of the housing; and
      an axle extending through the first bearing sleeve and the second bearing sleeve and through the roller, such that the roller is rotatably mounted on the axle within the housing;
      wherein axial ends of the axle are respectively positioned in and rotatable relative to the first bearing sleeve and the second bearing sleeve,
      wherein the first bearing sleeve and the second bearing sleeve each have a U-shaped cross-section defined by a center ring including a bearing surface for the axle, and an inner lip and an outer lip arranged on opposite ends of the center ring that extend radially outwardly from the center ring, and the inner lips and the outer lips axially retain the first bearing sleeve and the second bearing sleeve with the housing,
      and the first bearing sleeve and the second bearing sleeve are freely rotatable.

8. The cam arrangement of claim 7, further comprising a plurality of needles positioned between the axle and the roller for rotatably mounting the roller on the axle.

9. The cam arrangement of claim 7, wherein an axial clearance is defined between both (a) the inner lips and the housing, and (b) the outer lips and the housing.

* * * * *